Sept. 24, 1968    G. C. EMO    3,403,400
TARGET TRACKING RADAR FRONT EDGE TRACKING
Filed Nov. 1, 1967    5 Sheets-Sheet 1

George C. Emo,
INVENTOR.

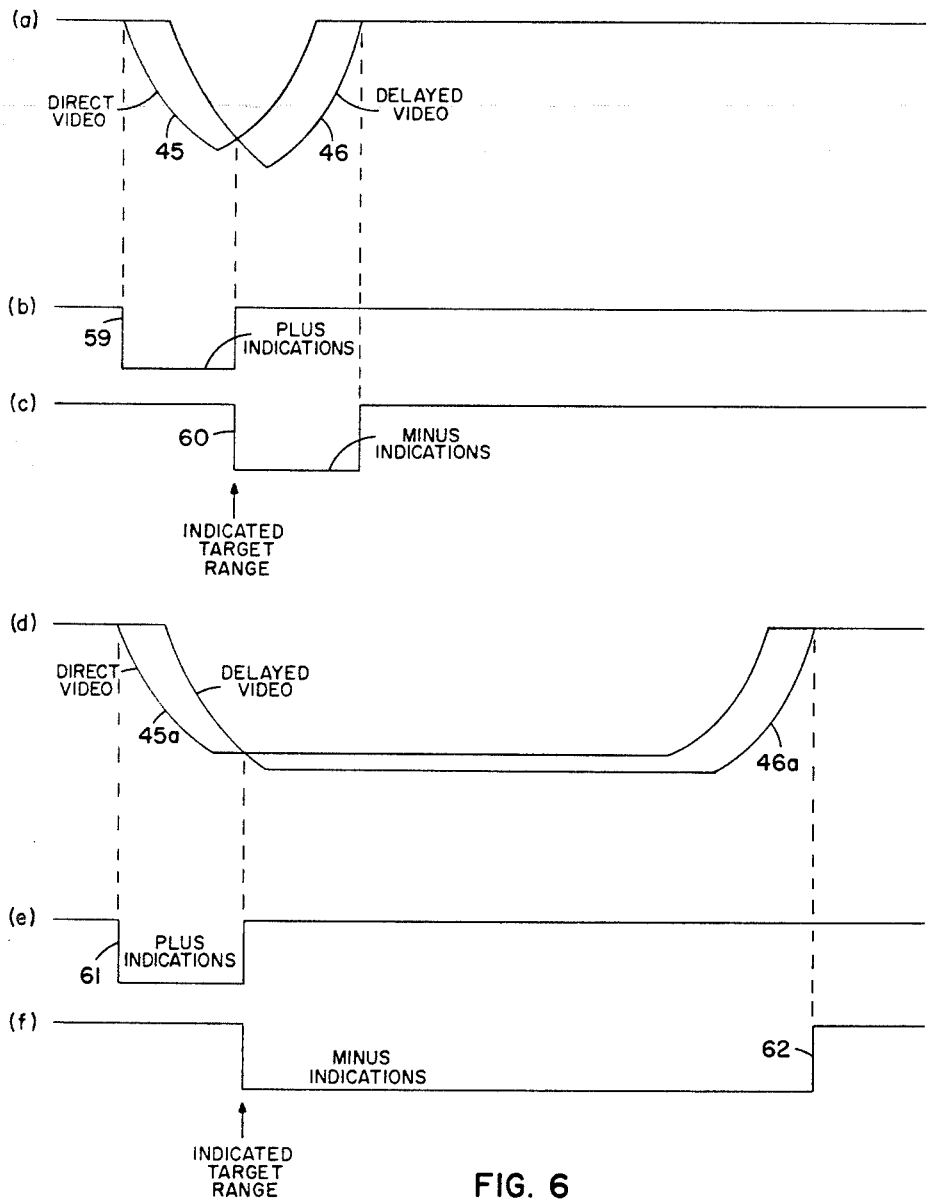

United States Patent Office 3,403,400
Patented Sept. 24, 1968

3,403,400
TARGET TRACKING RADAR FRONT
EDGE TRACKING
George C. Emo, Raritan, N.J., assignor, by mesne assignments, to the United States of America as represented by the Secretary of the Army
Filed Nov. 1, 1967, Ser. No. 679,939
3 Claims. (Cl. 343—17.1)

ABSTRACT OF THE DISCLOSURE

A target tracking radar that tracks returned wide echo signals caused by heating of an atmospheric re-entry body or explosion of a land vehicle. Heating of an atmospheric re-entry body or explosion of a land vehicle reflects a wide echo signal back to the target tracking radar. With proper adjustment of a radar computer, either the leading or the trailing edge of the wide echo signal may be tracked.

Background of the invention

The field of the invention relates to radar range detection circuits and more particularly to radar range detection circuits that can track either edge of the returned wide target echo signal.

Range detection circuits have been developed which will track a normal shaped signal over an amplitude range of 40 db input intermediate frequency signal. In the normal shaped video signal tracking in use at the present, the negative portion of a rectified signal from the intermediate frequency detector is applied to a delay network. A direct video output and a delayed video output from the delayed network are of equal amplitude and are separated in time by 0.2 microsecond. These direct and delayed video signals are applied to a difference detector. During the time the direct video is more negative than the delayed video, a negative output is present on one output lead of the difference detector. When the delayed video is more negative than the direct video, a negative output is present on a second output lead of the difference detector. If a nominal minus voltage is pulsed to zero on one input of a p-n-p inverter NAND logic circuit coincident with the zero voltage level of the one output lead from the difference detector on a second input of the NAND logic circuit, the output of the NAND logic circuit is considered a plus indication. If the nominal minus voltage is pulsed to zero on one input of the NAND logic circuit coincident with the zero voltage level of the other output lead from the difference detector on the second input of the NAND logic circuit, the output of the NAND logic circuit is considered a minus indication. If the nominal minus voltage is pulsed to zero on one input of the NAND logic circuit, not coincident with either of the negative signals from the difference detector or coincident with both negative signals from the difference detector, the output of the NAND logic circuit is considered a zero indication. A typical p-n-p inverter NAND logic circuit is shown on page 183 of a book entitled "Digital Computer Design Fundamentals" by Yaohan Chu published by McGraw-Hill Book Company Inc., printed in 1962.

The previous target tracking radars recognize a plus-minus, plus-zero-minus, or plus-zero-zero-minus as a target indication. If the sample indications had more than two zeroes between the plus and minus, the target tracking radars could not recognize the target under those conditions.

Summary of the invention

In the present system, by adjusting the amplitude of the direct video signal to be less than that of the delayed video signal, all normal capabilities can be maintained and the system can also track the front edge of wide target echoes over the same range of input amplitude variations. In this system, there is no switching from one mode of operation to the other, and therefore, no operator intervention is necessary. The amplitude of the direct video signal is adjusted to be less than that of the delayed video amplitude by adjusting a direct video gain control in the delay network. This limits the number of zero indications to no more than two such that the front edge of a wide target echo can be tracked.

It is an object of the present invention to provide a method of front edge tracking capability of wide target echoes, due to heating on re-entry of a missile or explosion of a tank.

It is another object of the present invention to provide range detection circuits where all normal capabilities can be maintained, and the system can also track the front edge of wide target echoes over the same range of input amplitude variations.

It is still another object of the present invention to provide a system where there is no switching from one mode of operation to the other, and therefore, no operator intervention is necessary.

The foregoing features of the present invention will be more readily understood after reading the following description in conjunction with the accompanying drawing.

Brief description of the drawing

FIGURE 6(a), (b), (c), (d), (e) and (f) are samples of target echoes with the direct video signals adjusted to 90% of the delayed video signals and showing both the normal and the wide target echoes with resulting indicated target position near the leading edge of a wide pulse target echo.

Description of the preferred embodiment

Figure 1:
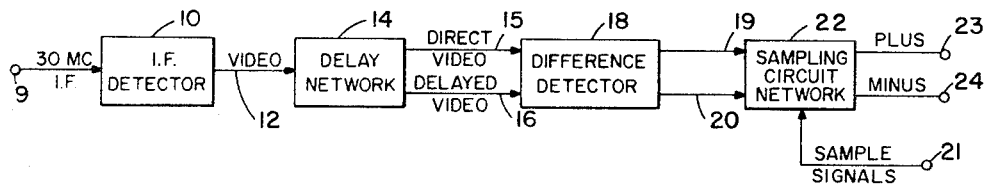
FIGURE 1 shows a schematic diagram in block form in which the present invention is practiced.

Referring to FIGURE 1, a train of intermediate frequency signals from the intermediate frequency output of a radar receiver is fed to terminal 9. These signals are fed into intermediate frequency detector 10, where the signals are detected, amplified, and inverted in the well-known manner. The detected video signals develop negative pulses on output lead 12 of intermediate frequency detector 10. The negative pulses are applied to delay network 14. Delay network 14 has one circuit that passes video pulses directly through and out on lead 15, after the amplitude has been lowered below its input value, and another circuit with time delay network for delaying the direct video by 0.2 microsecond, with output on lead 16. The direct video signal on lead 15 and delayed video on lead 16 are applied to difference detector 18. When the direct video is more negative than the delayed video, there is a negative output on lead 19 of difference detector 18. Likewise, when the delayed video is more negative than the direct, there is a negative output on lead 20 of difference detector 18. If both direct and delayed video are the same, there is a zero potential on both leads 19 and 20. The potentials on leads 19 and 20 are applied to sampling circuit network 22, which contains a NAND logic sampling circuit. A third input 21 to the NAND logic circuit of sampling circuit network 22 receives a train of pulses, pulsed from a nominal minus voltage to zero, from a radar modulation generator (not shown). Output terminals 23 and 24, of sampling circuit network 22, are for connection to a memory circuit for target determination purposes.

Figure 2:
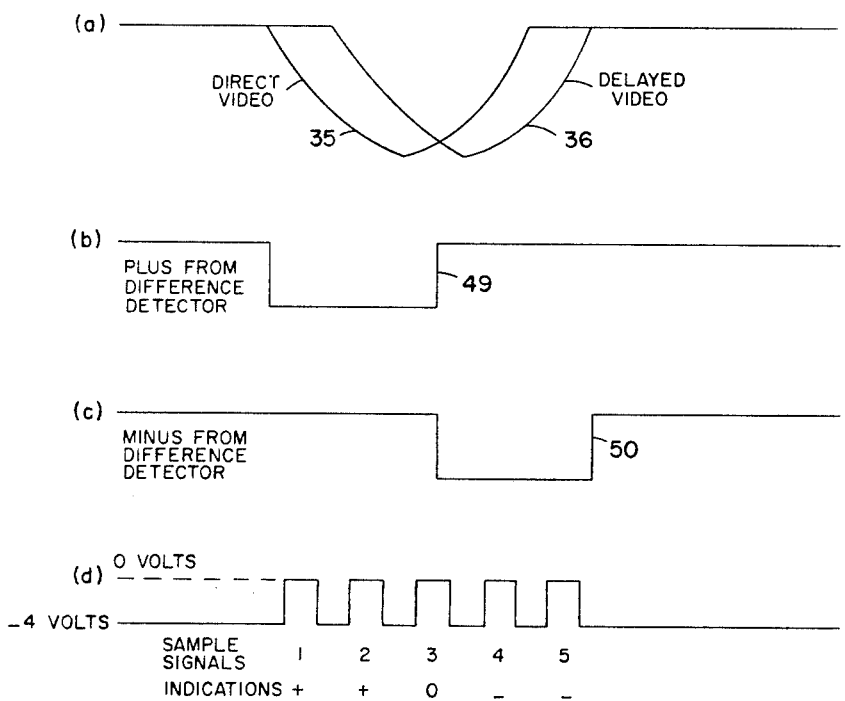
FIGURE 2(a), (b), (c) and (d) show prior art waveforms of direct and delayed video output from a delay network; the waveforms illustrating the outputs of a difference detector that are applied to a NAND logic circuit; and corresponding sample gate pulses applied to the NAND logic circuit.

One negative cycle of prior art system front edge tracking showing outputs of delay network 14 can be seen in FIGURE 2(a). Direct video 35 precedes delayed video 36 by 0.2 microsecond in the output of delay network 14. In FIGURE 2(b) and (c), the output pulses of difference detector 18 are shown. Pulse 49 in FIGURE 2(b) is coincident with direct video wave 35 of FIGURE 2(a) as long as direct video wave 35 is more negative than delayed video wave 36. When delayed video wave 36 becomes more negative than direct wave 35, pulse 50 of FIGURE 2(c) is coincident with delayed video wave 36. The train of pulses at terminal 21, as shown in FIGURE 2(d), are applied to sampling circuit network 22. For the purpose of illustration, a pulse at terminal 21, coincident with pulse 49, is considered a plus; a pulse at terminal 21 either not coincident with pulses 49 and 50, or coincident with both pulses 49 and 50, is considered a zero; and a negative pulse at terminal 21, coincident with pulse 50, is considered a minus. These indications are as shown in FIGURE 2(d).

Figure 3:
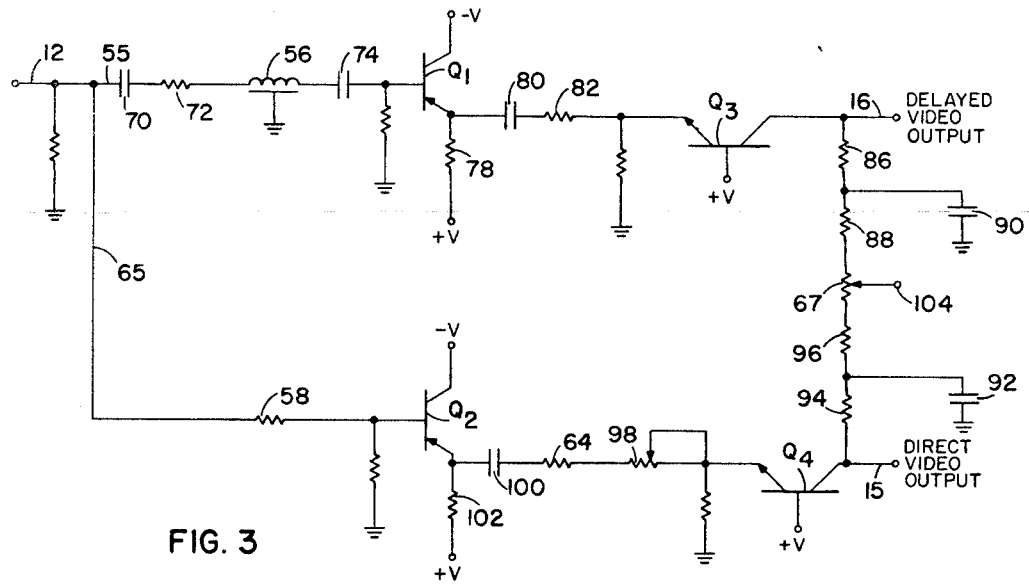
FIGURE 3 is a schematic diagram of a delay network according to the invention.

FIGURE 3 shows the details of delay network 14 including a video gain control according to the invention. A negative pulse from the intermediate frequency detector, present on lead 12, is applied to the base of p-n-p transistors Q1 and Q2 through leads 55 and 65, the delay and direct circuits, respectively. The video signal applied to the base of transistor Q1 passes through capacitor 70, resistor 72, delay line 56, and capacitor 74. Delay line 56 delays the video input on lead 55, to the base of transistor Q1, by 0.2 microsecond. The input to the base of transistor Q2 is attenuated by resistor 58 so that the direct and delayed signals are approximately equal in amplitude at corresponding points within the circuit. Transistors Q1 and Q2 provide impedance matching between the delay line or attenuator and common base n-p-n transistor amplifiers Q3 and Q4. The collectors of p-n-p transistors Q1 and Q2 are biased with a negative voltage —V, and the emitters are biased with a positive voltage V through resistors 78 and 102. When the base of transistors Q1 and Q2 receive the negative pulse from lead 12, transistors Q1 and Q2 begin conducting. With transistors Q1 and Q2 biased to conduction, a negative signal passes through capacitor 80 and resistor 82 to the emitter of n-p-n transistor Q3 and through capacitor 100, resistor 64 and direct video gain control potentiometer 98 to the emitter of n-p-n transistor Q4. The base of each transistor Q3 and Q4 has positive voltage +V attached thereto. The collectors of transistors Q3 and Q4 are connected to D-C balance control to make the D-C levels of both collectors equal. This is done by adjusting potentiometer 67 so that a positive D-C voltage source applied at terminal 104, will be evenly divided between the point on potentiometer 67 and across resistors 88 and 86 and resistors 96 and 94. Capacitors 90 and 92 further enhance a balanced D-C voltage level at the collectors of transistors Q3 and Q4. This D-C voltage level at the collectors of transistors Q3 and Q4 remains balanced until the negative signal is impressed on the emitters of transistors Q3 and Q4, whereupon transistors Q3 and Q4 begin conducting and pass a delayed negative video pulse to output lead 16 and a direct negative pulse to output lead 15. The direct negative pulse to output lead 15 is made less than that of the delayed negative pulse, for example, 90% thereof, to output lead 16 by adjusting direct video gain control potentiometer 98.

Figure 4:
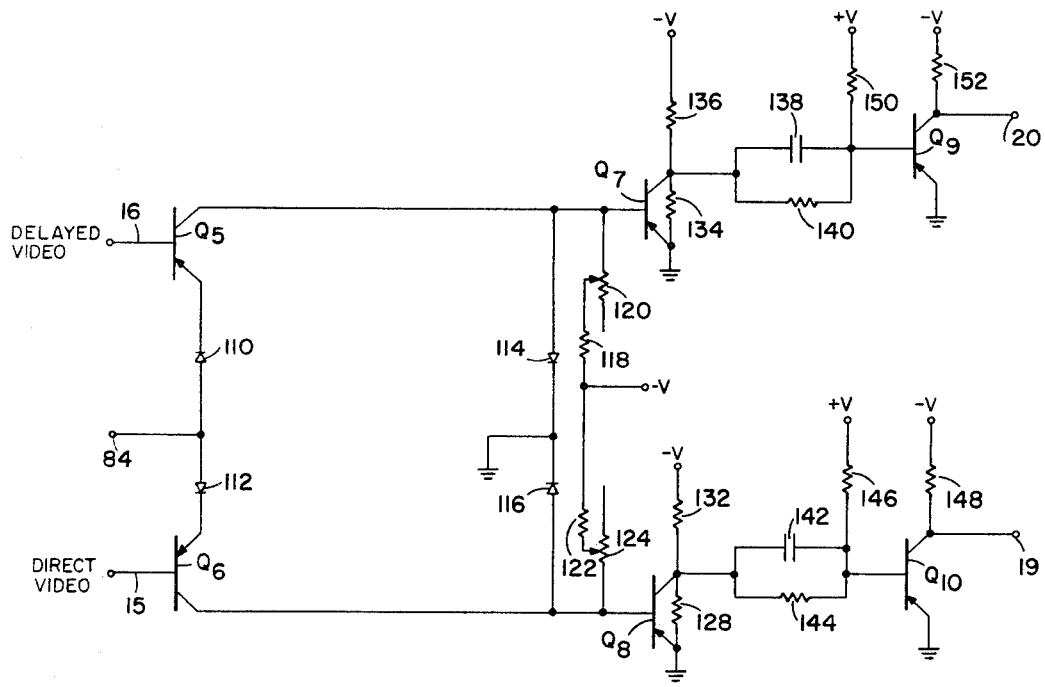
FIGURE 4 is a schematic diagram of a difference detector employed in the present invention.

FIGURE 4 shows the details of difference detector 18 that receives direct and delayed video signals over leads 15 and 16 from delayed network 14. The 90% amplitude direct video signal and the delayed video signal are impressed at the base of p-n-p transistors Q6 and Q5 respectively. Transistors Q5 and Q6 form a differential amplifier. The emitters of transistors Q5 and Q6 are connected through forward biased diodes 110 and 112 to terminal 84 that has a positive constant current applied thereto. Diodes 110 and 112 limit the positive voltage on the collectors of transistors Q5 and Q6 when the transistors are conducting. If the signal from delay network 14 is more negative at the base of transistor Q5 than at the base of transistor Q6, the current in Q5 will increase and the current in Q6 will decrease. When current decreases in Q6, the current will increase in p-n-p transistor Q8. The collector voltage of transistor Q8 will vary from a negative value to zero volts as the base current changes from zero to maximum, and with the voltage dividing network across transistor Q8 from negative voltage source —V, resistors 132 and 128 to ground. Transistor Q10 is a logic switch that is needed to be compatible with the following sampling circuits in the target tracking radar. Transistor Q10's output will be negative under these conditions. Capacitor 142 and resistor 144 couple transistors Q8 and Q10. A positive voltage source V biases the base of transistor Q10 through resistor 146. Negative voltage source —V connected to the collector of transistor Q10 through resistor 148, causes a negative pulse at terminal 19 during the short time that transistor Q10 is nonconductive. Diodes 114 and 116 limit the positive voltage admitted to the bases of transistors Q7 and Q8. Resistors 118 and 122, potentiometers 120 and 124 balance the negative voltage from negative voltage source —V to the bases of transistors Q7 and Q8. Potentiometers 120 and 124 are adjusted to make the outputs at terminal 19 and 20 zero volts when the input signals on leads 15 and 16 are at equal potential. The function of transistors Q7 and Q9 are the same as transistors Q8 and Q10 when the signal from delay network 14 is more negative at the base of transistor Q6 than at the base of transistor Q5. The voltage dividing network across transistor Q7 is from negative voltage source —V, resistor 136 and resistor 134 to ground. Capacitor 138 and resistor 140 couple transistors Q7 and Q9. A positive voltage source V biases the base of transistor Q9 through resistor 150. Negative voltage source —V connected to the collector of transistor Q9 through resistor 152, causes a negative pulse at terminal 20 during the short time that transistor Q9 is nonconductive.

Figure 5A:
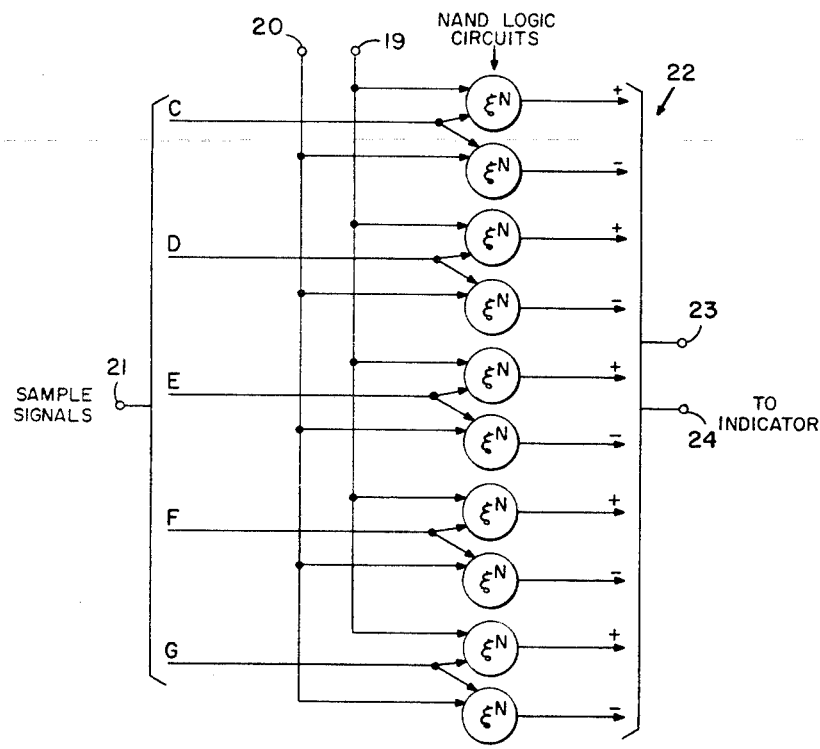
FIGURE 5(a) and (b) illustrate diagrammatically the input and output signals of the sampling circuit network and specifically, the sequence of sample signals at the input of the various sampling circuits.
Figure 5B:
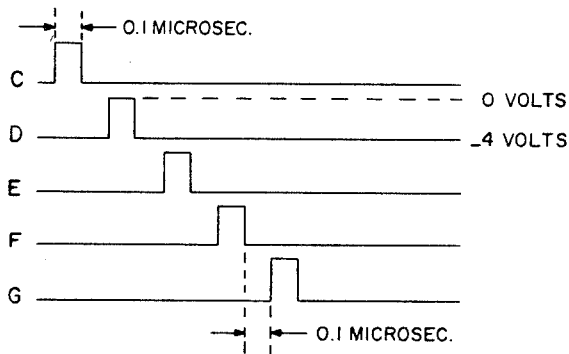

FIGURE 5(a) and (b) illustrate the arrangement of the inputs and outputs of the NAND logic sampling circuit network 22. In FIGURE 5(a), each lead 19 and 20 from difference detector 18 is shown alternately connected to every NAND logic sampling circuit. Sample signals C, D, E, F, and G are shown as they are connected to the inputs of alternate pairs of NAND logic circuits. Each NAND logic circuit then has two inputs, one from either lead 19 or lead 20 from difference detector 18 and the other from sample signals as shown in FIGURE 5(b). Sampling circuit network 22 has two outputs, one each at terminals 23 and 24, that feed data into an indicator of the target tracking radar for proper tracking.

FIGURE 6 shows the wave shapes obtained by the present invention where direct video 45 is biased to 90% of delayed video 46. FIGURE 6(a) shows normal target echo wave shapes 45 and 46 separated by 0.2 microsecond, with pulse 59 from one output of difference detector 18, as shown in FIGURE 6(b), coincident with the direct video wave 45 when it is more negative than the delayed video wave 46, and pulse 60 from the other output of difference detector 18, as shown in FIGURE 6(c), coincident with the delayed video wave 46 when it is more negative than the direct video wave 45. FIGURE 6(d) shows wide target echo wave shapes 45a and 46a with their leading and trailing edges separated by 0.2 microsecond, with pulse 61 from one output of difference detector 18, as shown in FIGURE 6(e), coincident with the direct video waves 45a when it is more negative than the delayed video wave 46a, and pulse 62 from the other output of difference detector 18, as shown in FIGURE 6(f), coincident with the delayed video wave 46a when it is more negative than the direct video wave 45a. The target tracking radars recognize a plus-minus, plus-zero-minus, or plus-zero-zero-minus as a target indication. In the previous system, if the video input signal widens, the indications will have more than two zeroes between the plus and minus. Thus, the target tracking radars cannot recognize a target under these conditions. By the amplitude of direct video 45 being 90% of the amplitude of delayed video 46, as shown in FIGURE 6(d), then even when the wide target video increases, the crossover point is still at the same relative location. The crossover point shows the indicated target range, as shown in FIGURE 6(f), and is at the leading edge of the wide target echoes.

Figure 7:
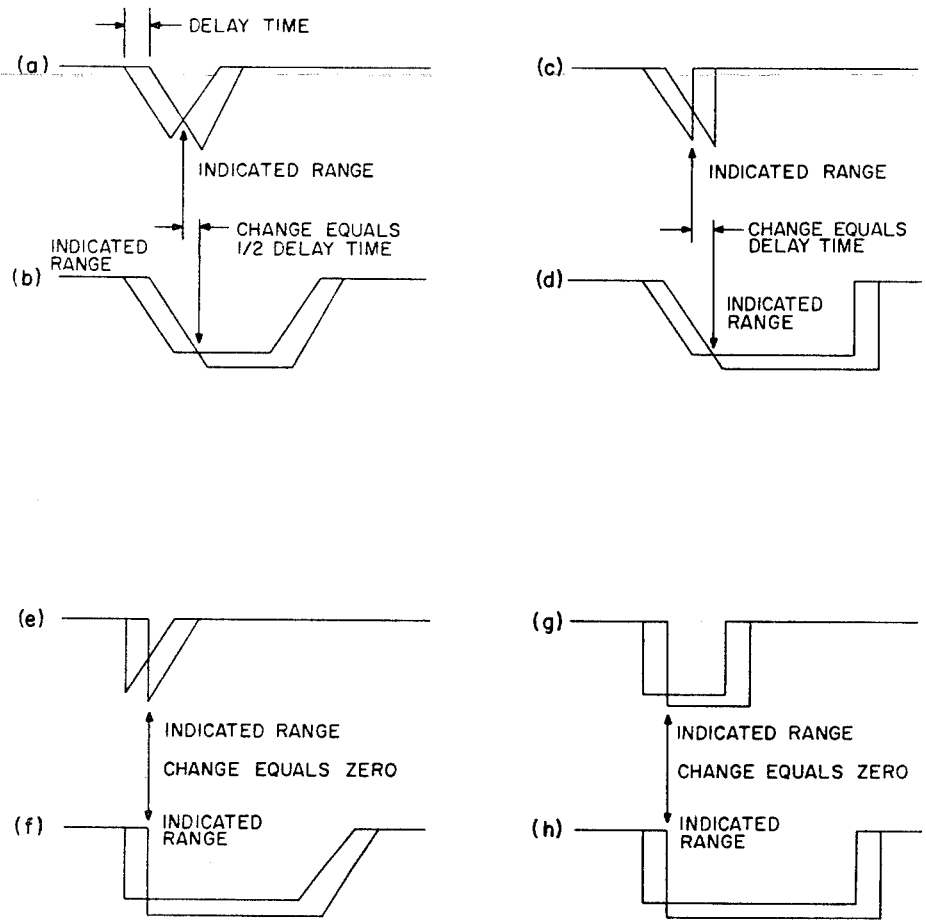
FIGURE 7(a), (b), (c), (d), (e), (f), (g) and (h) show four different waveshapes with indicated range for normal and wide video, and the expected change in indicated range from one to the other.

Errors in indicated range when changing from normal video track to wide video track depend upon the wave shape of the video input. In FIGURE 7, there are shown four different wave shapes with direct video waves adjusted to 90% of the delayed video waves. Normal video waves are shown in FIGURE 7(a), (c), (e) and (g) and their corresponding wide video waves are shown in FIGURE 7(b), (d), (f) and (h). The indicated ranges are shown for all normal and wide video waves, and also their expected change in indicated range from one to the other. The maximum change in indicated range for these wave shapes is equal to the delay between direct and delayed video waves, which in the target tracking radar is 0.2 microsecond, and is shown in FIGURE 7(c) and (d). For a more representative signal shape, such as the triangular video signal of FIGURE 7(a) and (b), the maximum change in indicated range is one-half the delay time. In the target tracking radar this is 0.1 microsecond.

Errors in indicated range will occur with changes in wave shapes, but not with changes in amplitude. Video wave shapes will be varied by the presence of noise in the target tracking radar system. If random noise is assumed, the change in wave shapes will move the target tracking point equally in front and behind the proper point. Averaging these results will give the proper tracking point. This averaging is done every 32 periods in the present target tracking radar system. The tracking point will not change with amplitude because the same amplitude relationship will exist between the direct and delayed video independent of absolute amplitude. The adjustment of the direct video amplitude to be less than that of the delayed video amplitude does not affect the stability to the crossover point from plus to minus. Since all other constants, in the range unit, have not changed, the tracking signal will not be affected.

While there has been described what is at present considered the preferred embodiment of the present invention, it should be obvious to those skilled in the art that various changes and modifications may be made therein without departing from the invention.

I claim:
1. A target tracking radar system for front edge tracking comprising an intermediate frequency detector including an input adapted to be connected to a source of intermediate frequency signals, said intermediate frequency detector rectifying said intermediate frequency signals permitting only the negative half of said intermediate frequency signals to pass; a delay means connected to an output of said intermediate frequency detector and including a first and a second output, said first output being said rectified intermediate frequency signal with a time delay, and said second output being said rectified intermediate frequency signal with amplitude adjusted to be less than that of said intermediate frequency signal value at the input of said delay means; a difference detector including a first and a second input and a first and a second output, said first input being connected to said time delayed intermediate frequency signal from said first output of said delay means, said second input being connected to said amplitude adjusted intermediate frequency signal from said second output of said delay means, said difference detector including a comparator means for determining which of said inputs of said first input and said second input of said difference detector is more negative than the other input, said first output of said difference detector having a negative pulse when said direct video signal at said first input of said difference detector is more negative than said delayed video signal at said second input of said difference detector, and said second output of said difference detector having a negative pulse when said delayed video signal at said second input of said difference detector is more negative than said direct video signal at said first input of said difference detector; a sampling circuit network including first, second and third inputs and first and second outputs, said first and second inputs of said sampling circuit network being connected to said first and second outputs of said difference detector, said third input to said sampling circuit network being adapted for receiving a train of pulses that are pulsed from a nominal minus voltage to zero, said sampling circuit network including means for providing a negative pulse at said first output of said sampling circuit network according to the coincidence of zero voltage levels of said sample signals at said third input of said sampling circuit network with a zero voltage level at said first input of said sampling circuit network, and for providing a negative pulse at said second output of said sampling circuit network according to the coincidence of zero voltage levels of said sample signals at said third input of said sampling circuit network with a zero voltage level at said second input of said sampling circuit network.

2. A target tracking radar system for front edge tracking as set forth in claim 1 wherein said rectified amplitude adjusted direct intermediate frequency signal in said delay means is attenuated by a direct video gain control.

3. A target tracking radar system for front edge tracking as set forth in claim 2 wherein said direct video gain control is variable.

References Cited

UNITED STATES PATENTS 3,307,185  2/1967  Mefford _____ 343—17.1

RODNEY D. BENNETT, *Primary Examiner.*

C. L. WHITHAM, *Assistant Examiner.*